Figure 1:
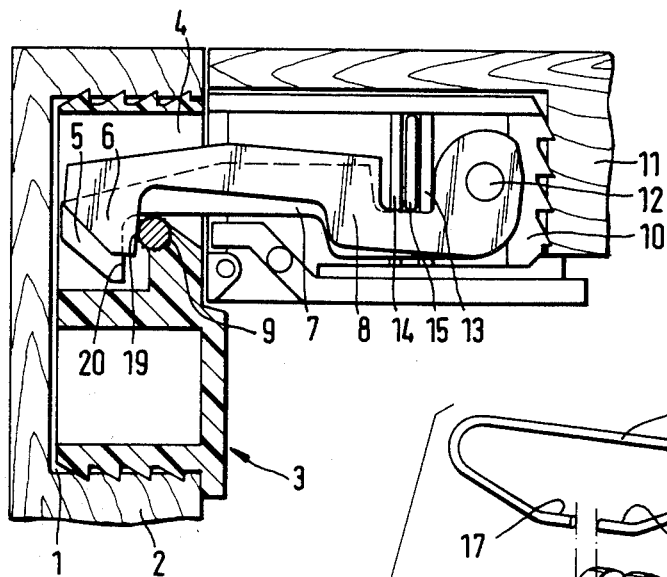

United States Patent [19]

Salice

[11] Patent Number: 4,502,807

[45] Date of Patent: Mar. 5, 1985

[54] CONNECTING FIXTURE

[75] Inventor: Luciano Salice, Carimate, Italy

[73] Assignee: Arturo Salice S.p.A., Novedrate, Italy

[21] Appl. No.: 504,378

[22] Filed: Jun. 14, 1983

[30] Foreign Application Priority Data

Jun. 16, 1982 [EP] European Pat. Off. ........ 82105287.5

[51] Int. Cl.³ .............................................. B25G 3/00
[52] U.S. Cl. ..................................... 403/11; 403/330; 403/231; 403/407
[58] Field of Search ............... 403/330, 231, 407, 406, 403/405, 11

[56] References Cited

U.S. PATENT DOCUMENTS

| | | | |
|---|---|---|---|
| 2,291,782 | 8/1942 | Allring | 403/407 |
| 3,456,969 | 7/1969 | Wittenmayer | 403/406 |
| 4,160,610 | 7/1979 | Austen-Brown et al. | 403/407 |
| 4,272,207 | 6/1981 | Lautenschlager | 403/231 |

FOREIGN PATENT DOCUMENTS 547564  5/1977  U.S.S.R. ............... 403/330

Primary Examiner—Andrew V. Kundrat
Attorney, Agent, or Firm—Fleit, Jacobson, Cohn & Price

[57] ABSTRACT

A connecting fixture is provided for detachably connecting two platelike furniture parts, which abut preferably at right angles to each other. The connecting fixture comprises two fixture elements, which are adapted to be secured to one of the furniture parts to be connected and one of which comprises a detent lever, which is mounted to be pivotally movable against the force of a spring and at its forward end carries a hook-shaped detent projection, which when the detent lever has been pushed into an opening of the other fixture element snaps with its rear side face behind a step or bar of the other fixture element, which step or bar has a supporting edge. The radial distance from said side face to the pivotal axis of the detent lever continuously decreases toward the root of said side face and the side face when snapped in lies on the supporting edge above the root of the side face. Two or more than two spring-loaded detent levers are provided, which are parallel to each other and in which the side faces of the detent projections are spaced different radial distances from the common pivotal axis of the detent levers.

9 Claims, 11 Drawing Figures

CONNECTING FIXTURE

This invention relates to a connecting fixture for detachably connecting two platelike furniture parts, which abut preferably at right angles to each other, comprising two fixture elements, which are adpated to be secured to one of the furniture parts to be connected and one of which comprises a detent lever, which is mounted to be pivotally movable against the force of a spring and at its forward end carries a hook-shaped detent projection, which when the detent lever has been pushed into an opening of the other fixture element snaps with its rear side face behind a step or bar of the other fixture element, which step or bar has a supporting edge, the radial distance from said side face to the pivotal axis of the detent lever continuously decreasing toward the root of said side face and the side face when snapped in lies on the supporting edge above the root of the side face. European Patent Application No. 81103813.2, which is no prior publication, discloses a connecting fixture which is of that kind and can be used to assemble furniture parts in a simple manner and without a need for a tool. For that purpose the fixture elements are moved toward each other until the detent projection of the detent lever snaps behind the supporting edge and pulls the fixture elements together by a self-clamping action. The self-clamping action of the fixture elements is due to the fact that the side face engaging the supporting edge is slightly inclined and extends at a small wedge angle so that the fixture elements are forced against each other under the action of the spring which biases the detent lever. The slight inclination of the rear side face of the hook-shaped portion of the detent lever is due to the location of the pivot pin of the detent lever. Said pivot should be located in such a manner that the radial distance from that point of the side face where the latter is supported on the supporting edge to the pivotal axis of the detent lever slightly increases continuously in the direction in which the supporting edge runs up on the side face. To maintain the self-clamping action, a clearance between the point where the side face is supported on the supporting edge and the root or end of the side face of the detent lever must remain when the fixture elements are locked by the snap-in action so that any backlash between the fixture elements and the furniture parts connected by the fixture elements, which backlash would be due to a further slipping of the side face on the supporting edge, will be prevented.

Whereas the known connecting fixture has proved most satisfactory, its assembling may be difficult if the fixture elements are not fixed with adequate precision to the furniture parts which are to be connected. In that case the fixture elements may not directly support each other but may be supported on the furniture parts or the furniture parts may support each other, and the distance between the fixture elements may be excessively large so that the rear side faces of the detent projections no longer snap behind the supporting edges but the detent projections lie on the supporting edges. The fixture elements of the known connecting fixtures must be fixed fairly accurately to the furniture parts which are to be connected because tolerances cannot be compensated by the connecting fixture unless they are within the limits defined by the inclined rear side face of the detent projection.

For this reason it is an object of the invention so to improve the known connecting fixture that it will be fully effective even when the fixture parts are fixed with a substantial inaccuracy to the furniture parts which are to be connected.

This object is accomplished in accordance with the invention in that two or more than two spring-loaded detent levers are provided, which are parallel to each other and in which the side faces of the detent projections are spaced different radial distances from the common pivot axis of the detent levers. When the fixture elements of the connecting fixture according to the invention are fixed to the furniture parts and are then interfitted, the detent projection having that side face which is spaced the larger radial distance from the common pivotal axis of the detent levers will first snap behind the supporting edge so that that detent lever whose side face has the larger radial spacing can compensate relatively large inaccuracies of the fixation. If the fixture elements have been fixed with a higher accuracy to the furniture parts which are to be connected, the side face of the detent projection of the other detent lever, which side face has a smaller radial spacing from the common pivotal axis, will also snap behind the supporting edge and will effect a self-clamping connection between the fixture elements whereas the first detent lever merely bears on the supporting edge whereas its side face no longer contacts the supporting edge.

The side face of the detent projection of that detent lever which comprises the side face having the smaller radial spacing is suitably arranged to snap just behind the supporting edge before the side face of the detent projection of the other detent lever, which side face has a larger radial spacing, engages the supporting edge at the bottom of the latter side face, i.e., at that portion of the detent lever which adjoins its side face. As a result, the self-clamping actions of the two side faces overlap each other so that substantial inaccuracies of the fixation can be compensated.

As the two detent levers must be spring-loaded independently of each other, a further feature of the invention resides in that the detent levers are supported by the legs of a U-shaped spring consisting of spring wire or leaf spring strips, which spring has a crosspiece which extends transversely to the detent levers and is supported in the housing whereas said legs are directed toward each other. In that arrangement, a single spring is sufficient, which has two legs which are resiliently movable independently of each other and resiliently support respective ones of the detent levers.

In accordance with the invention, a second teaching how the object set forth can be accomplished calls for the provision of a supporting edge which is constituted by the end face of a collarlike rim of a disc, which is mounted in the housing of the fixture element to be rotatable transversely to the plane in which the detent lever is pivotally movable, and said rim has above the disc a height which varies continuously. If inaccuracies of the fixation prevent the hook-shaped detent projection of the detent lever from snapping with its clamping side face behind the supporting edge formed by the collar, then it will be sufficient to rotate the disc until the supporting edge is formed by the rim of the disc at a point which has a smaller height above the disc. The collarlike rim may be constituted by a cylindrical or frustoconical rim.

The circular disc is suitably provided only around part of its periphery with a collar which continuously decreases in height from one side to the other.

The disc may be rotatably mounted in a cylindrical recess of the housing. To permit the disc to be rotated in a simple manner, the bottom of the cylindrical recess in the housing of the fixture element may have a central hole, in which a slot is disposed, which is formed in the disc is engageable by a screwdriver. In that case the disc can easily be moved by means of a screwdriver to a position in which the rear side face of the detent projection of the detent lever snaps behind the collarlike rim so as to exert a self-clamping action.

In order to limit the angle through which the disc can be rotated, the cylindrical recess in the housing can be provided with lateral stops for the side edges of the sector-shaped collar.

Illustrative embodiments of the invention will now be described more in detail with reference to the drawing, in which FIG. 1 is a sectional view showing a connecting fixture for connecting two platelike furniture parts, which abut at an angle. The detent lever provided with the side face which has the smaller radial spacing from the pivotal axis engages and exerts a clamping action on the supporting edge, which is constituted by a pin.

Figure 2:
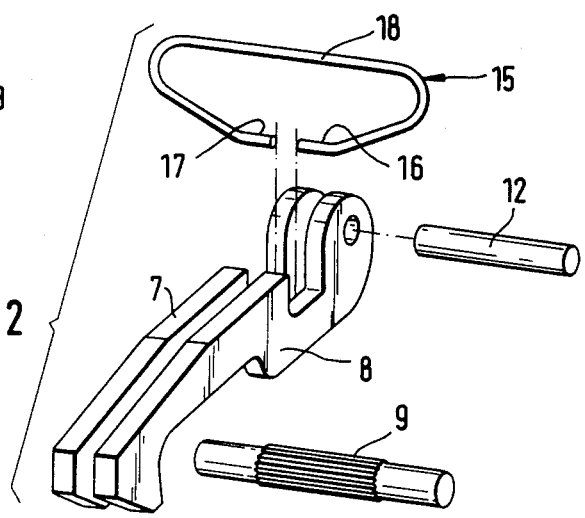

FIG. 2 is a perspective, partly exploded view showing the detent levers, the pivot pin, the U-shaped spring which biases the detent levers, and the supporting edge which is constituted by a grooved pin.

Figure 3:
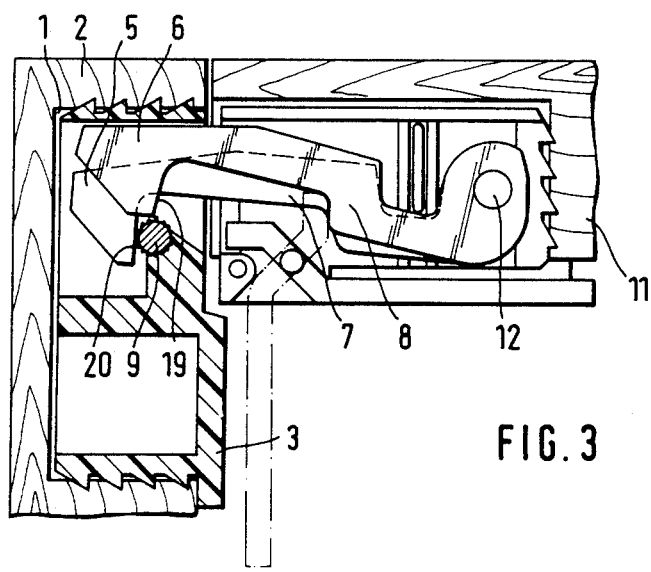
Figure 4:
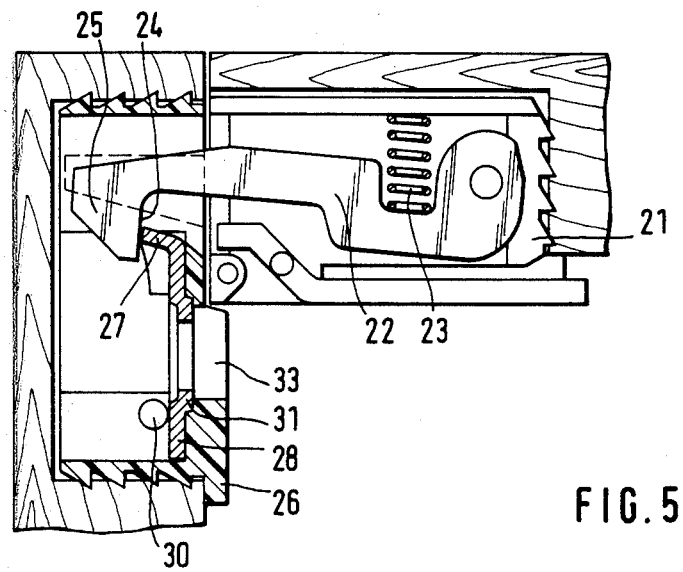
Figure 5:
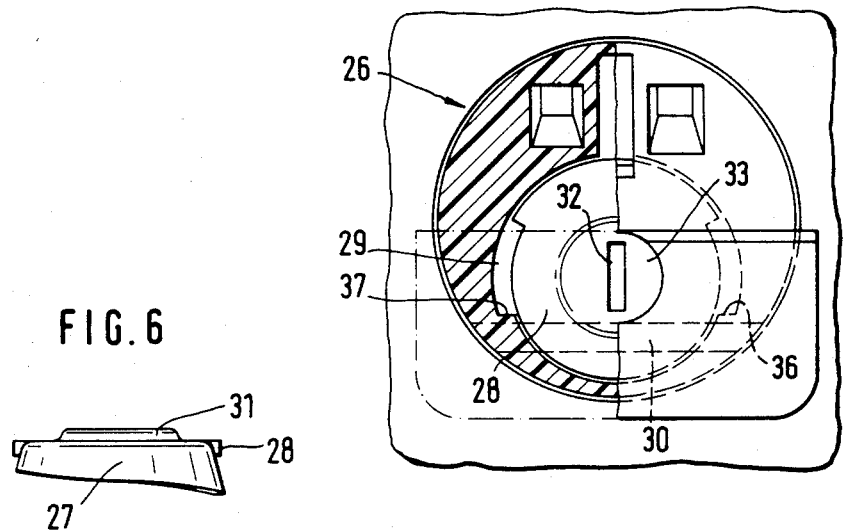
Figure 6:
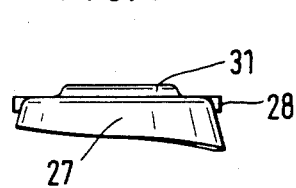
Figure 7:
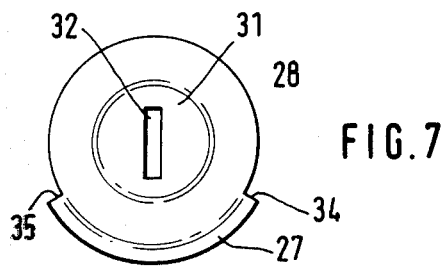
Figure 8:
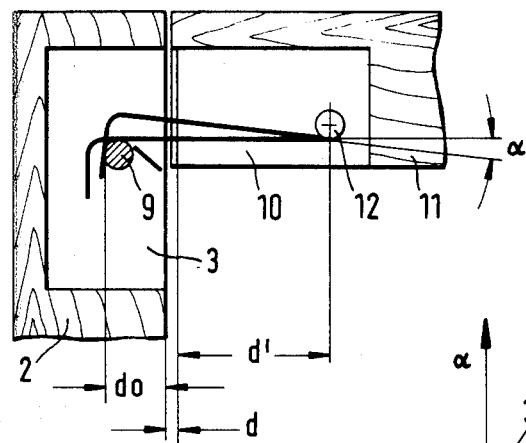
Figure 9:
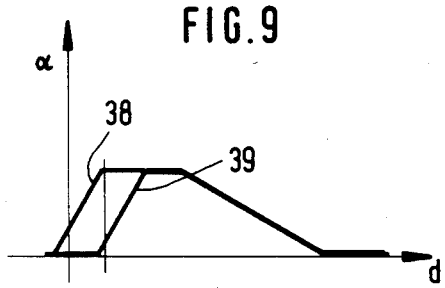
Figure 10:
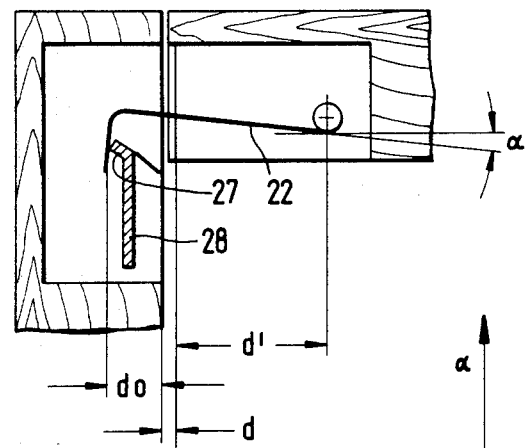

FIG. 3 is a sectional view which is similar to FIG. 1 and shows the connecting fixture in which the detent lever having the side face which has the larger radial spacing from the pivotal axis engages and exerts a clamping action on the supporting edge, FIG. 4 is a sectional view showing a connecting fixture according to another embodiment, which connects two platelike furniture parts, which abut at an angle, FIG. 5 is a front elevation, partly in section, showing the fixture element of FIG. 4 having a disc-shaped edge of varying height, FIG. 6 is a side elevation showing the disc which constitutes the supporting edge and has a collarlike rim, FIG. 7 is a front elevation showing the disc of FIG. 6, FIG. 8 is a diagrammatic drawing showing the connecting fixture of FIGS. 1 to 3, FIG. 9 is a graph illustrating the permissible tolerances in dependence on the angle of the pivotal movement of the detent levers of the connecting fixture of FIG. 8, FIG. 10 is a diagrammatic view showing the connecting fixture according to FIGS. 4 to 7, and FIG. 11 is a graph indicating the tolerances which can be compensated in dependence on the angular movement of the detent lever.

In the embodiment of the connecting fixture shown in pot-shaped fixture element 3 has been inserted into a blind hole 1, which has been milled into the vertical furniture wall 2. The fixture element 3 is provided with an opening 4, which is approximately rectangular in cross-section and serves to receive two detent levers 7, 8, which carry two hooks 5, 6. The underside of the receiving opening 4 rises in wedge shape to the pin 9, which constitutes the supporting edge and which is secured in the side walls of the pot-shaped fixture element 3. Behind the pin 9, the underside of the receiving opening 4 declines steeply so as to form a step. The pin 9 is disposed at the rear edge of the step and thus constitutes a supporting or detent edge. The underside of the receiving opening 4 adjoins the peripheral surface of the pin 9 approximately in a tangential direction and the pin 9 protrudes above the declining side of the step. As is apparent from FIG. 2, the intermediate portion of the pin 9 is formed with axially extending grooves.

The detent levers 7, 8 are pivoted on the pivot pin 12 in the also pot-shaped fixture element, which is secured in a bore that has been milled into the furniture part 11. A U-shaped spring 15 which has been bent from spring wire is mounted between transversely extending partitions 13, 14 of the fixture element 10. The legs 16, 17 of said spring are connected by a crosspiece 18, which is supported on the bottom wall of the pot-shaped housing of the fixture element 10. The legs 16, 17 of the U-shaped spring 15 are directed toward each other and each of them is supported in a recess of one of the closely spaced apart, parallel detent levers 7, 8, so that said detent levers are spring-biased independently of each other.

The detent projections 5, 6 of the detent levers 7, 8 have rear side faces 19, 20. The points of the side face 19 have a smaller radial spacing from the common pivotal axis 12 than the corresponding points of the side face 20.

When the fixture elements 3, 10 are secured in the bores that have been milled into the furniture parts 2, 11, the distances between the fixture elements may differ because the bore for the fixture element 10 does not have the intended spacing from the forward edge of the furniture part 11 or because the fixture element 3 has been forced into its bore to an excessively large depth.

In the arrangement shown in FIG. 1, the two fixture parts 3, 10 are spaced the correct distance from each other because the abutting parts of the fixture elements are aligned with the end edge or front face of the respective furniture part. If the fixture elements have been exactly fixed in that manner, the side face 19 of the projection 6 of the detent lever 8 snaps behind the pin 9, which constitutes the supporting edge.

In the example shown in FIG. 3, the bore for the fixture element 10 is inwardly offset an excessively large distance so that the forward edge of the fixture element 10 is no longer aligned with the end edge of the furniture part 11. Owing to this inaccurate fixation, the fixture elements are spaced a larger distance apart so that the side face 20 of the detent projection 5 of the detent lever 7, which side face has the larger radial spacing, snaps behind the pin 9, which constitutes the supporting edge. As a result, the inaccuracy of the fixation is compensated.

The illustrative embodiment shown in FIGS. 4 to 7 differs from that shown in FIGS. 1 to 3 in that only one detent lever 22, which is spring-loaded by the helical compression spring 23, is pivoted in the fixture element 21 and with the side face 24 of its detent projection 25 has snapped behind a supporting edge of the fixture element 26. That supporting edge is constituted by the raised collar 27 of the disc 28, which is rotatably mounted in the fixture element 26. The disc 28 is rotatably mounted in a substantially cylindrical chamber 29 of the fixture element 26 and is held in said chamber by a supporting pin 30. The disc 28 comprises a central concentric bulge 31, which is disposed in a mating recess of the housing of the fixture element 26 and virtually constitutes a centering stub pivot of the disc 28. Above that sector of the disc 28 which is shown in FIG. 7, the disc 28 is provided with a raised, frustoconical collar 27, the height of which above the disc 28 continuously decreases from the right to the left side of the collar as is shown in FIG. 6. As is apparent from FIG. 4, the end face of the collar 27 constitutes the supporting edge for the side face 24 of the detent projection 25 of the detent lever 22.

The central portion 31 of the disc 28 is provided with an elongated slot 32, which constitutes an opening for receiving a screwdriver. That screwdriver slot 32 is disposed with a bore or hole 33 in the forward wall of the fixture element 26. When the fixture elements are interfitted and it is found that the detent projection 26 of the detent lever 22 does not snap behind the collar 27, the height of the collar can easily be reduced in that the disc 28 is rotated by means of a screwdriver.

The lateral side faces 34, 35 of the collar 37 constitute steps, which are engageable with steps 36, 37 of the cylindrical recess 29 of the housing of the fixture element 26 in order to limit the angular movement of the disc 28.

FIG. 8 is a diagrammatic view showing the fixture of FIGS. 1 to 3. When the top face of one fixture element and the end face of the other fixture element are aligned with the associated planes of the furniture parts, which abut at an angle to each other, then the fixture elements have been exactly fixed and there are no inaccuracies which must be compensated. In case of an exact fixation the distance from the front face of the furniture part 2 to the rear face of the bolt 9, which constitutes the supporting edge, equals dO and the distance from the center line of the pivot pin 12 to the end edge of the furniture part 11 equals d'. In case of an inaccurate fixation, a clearance d must be compensated.

In the diagram shown in FIG. 9 the clearance d, which is due to an inaccurate fixation and can be compensated, is plotted against the angular movement of the detent levers. The straight line 38 represents the clamping movement which can be performed by the side face 19 of the detent projection 6 of the detent lever 8. The straight line 39 represents the clamping movement which can be performed by the side face 20 of the detent projection 5 of the detent lever 7. The graph shows that the clamping actions of the side faces overlap and that the two detent levers are capable of compensating fixation inaccuracies d which are twice as large as those which can be compensated with a single detent lever.

FIG. 10 is a diagrammatic view showing the connecting fixture shown in FIGS. 4 to 7. Regarding the distances dO and d' and the clearance d which is to be compensated, FIG. 10 corresponds to FIG. 8.

Figure 11:
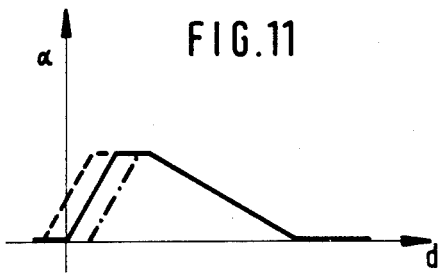

In FIG. 11, a solid line indicates the clearance d which can be bridged by the detent lever when the disc 28 with its collar 27, which constitutes the supporting edge is in the intermediate position shown in FIG. 5. Dotted lines and dash-dot lines respectively, indicate the conditions which will be obtained when the side face 24 of the detent projection 25 of the detent lever 22 has snapped behind the left and right sides of the collar 27.

What is claimed is:

1. A connecting fixture for detachably connecting two plate like furniture parts, abutting preferably at right angles to each other, said connecting fixture comprising:

two fixture elements, each fixture element having a housing adapted to be secured to one of the furniture parts to be connected and one of said two fixtures elements includes two detent levers mounted parallel to each other about a common pivot axis in one of said housings, a detent projection defined by each of said detent levers being hook-shaped and each detent projection including a side face, each side face being spaced a different radial distance from the common pivot axis and the radial distance from each said side face to said pivot axis continuously decreasing toward the root of said side face, a spring mounted in said one housing adapted to bias said two detent levers independently of each other, and the other of said two fixture elements includes a bar defining a supporting edge mounted in the other of said housings, an opening defined by said other housing being adapted to receive said detent projections when the detent levers have been pushed into said other fixture element and one of said detent projections snaps its side face behind said bar and the side face of the snapped in projection lies on the supporting edge at a distance spaced from its root.

2. A connecting fixture according to claim 1, characterized in that the side face of the detent projection of that detent lever which comprises the side face having the smaller radial spacing is arranged to snap just behind the supporting edge before the side face of the detent projection of the other detent lever, which side face has a larger radial spacing, engages the supporting edge at the bottom of the latter side face.

3. A connecting fixture according to claim 1, wherein said spring is U-shaped and, the detent levers are supported by the legs of said U-shaped spring, said spring includes a cross-piece which extends transversely to the detent levers and is supported in the housing whereas said legs are directed toward each other and have spaced apart ends.

4. A connecting fixture according to claim 3, characterized in that the U-shaped spring is held between two parallel partitions of the housing.

5. A connecting fixture for detachably connecting two platelike furniture parts, abutting preferably at right angles to each other, said connecting fixture comprising:

two fixture elements, each fixture element having a housing adapted to be secured to one of the furniture parts to be connected and one of said two fixture elements includes a detent lever mounted in one of said housings about a pivot axis, a detent projection defined by said detent lever being hook-shaped and including a side face, the radial distance from said side face to said pivot axis continuously decreasing toward the root of said side face, a spring mounted in said one housing adapted to bias said detent lever, and the other of said two fixture elements includes a rotatable disc mounted in the other of said housings, said rotatable disc including a collarlike rim end face defining a supporting edge having a continuously varying height, an opening defined by said other housing being adapted to receive said detent projection when the detent lever has been pushed into said other fixture element and said detent projection snaps its side face behind said rotatable disc adapted to be rotated transversely to the plane in which the detent lever is pivotally movable to locate said side face on said supporting edge at a distance spaced from its root.

6. A connecting fixture according to claim 5, characterized in that the rotatable disc is provided only around part of its periphery with said collarlike rim which continuously decreases in height from one side to the other.

7. A connecting fixture according to claim 5, characterized in that the rotatable disc is rotatably mounted in a cylindrical recess of the housing and is held by a transversely extending pin, which supports the disc.

8. A connecting fixture according to claim 5, characterized in that the bottom of the cylindrical recess has a central hole and the disc has a centrally disposed screwdriver slot, which is disposed in said hole.

9. A connecting fixture according to claim 7, characterized in that the cylindrical recess is provided with laterally disposed stops, which are engageable by the side edges of the collarlike rim.

* * * * *